United States Patent [19]

Christner et al.

[11] Patent Number: 4,961,750
[45] Date of Patent: Oct. 9, 1990

[54] ACRYLATE TANNING AGENT

[75] Inventors: Juergen Christner, Bickenbach; Ernst Pfleiderer, Darmstadt-Arheilgen; Tilman Taeger, Seeheim-Jugenheim; Gertrud Wick, Darmstadt, all of Fed. Rep. of Germany

[73] Assignee: Röhm GmbH, Darmstadt, Fed. Rep. of Germany

[21] Appl. No.: 223,794

[22] Filed: Jul. 25, 1988

[30] Foreign Application Priority Data

Jul. 27, 1987 [DE] Fed. Rep. of Germany ....... 3724807

[51] Int. Cl.$^5$ ................................................ C14C 3/22
[52] U.S. Cl. ..................................... 8/94.27; 8/94.23; 252/8.57
[58] Field of Search .............. 8/94.27; 252/8.57, 94.23

[56] References Cited

U.S. PATENT DOCUMENTS 3,463,785  8/1969  Buckman et al. ..................... 8/94.27
3,997,486  12/1976  Moore et al. ................... 260/23 CP

FOREIGN PATENT DOCUMENTS 208566   1/1983  Czechoslovakia .
0118213  9/1984  European Pat. Off. .
1930225  2/1970  Fed. Rep. of Germany .
2755087  12/1978  Fed. Rep. of Germany .
3141496  4/1983  Fed. Rep. of Germany .
3406912  9/1985  Fed. Rep. of Germany .
3406912  9/1985  Fed. Rep. of Germany .
1415763  9/1965  France .
1549717  11/1968  France .
2068496  8/1981  United Kingdom .
2068999  8/1981  United Kingdom .

OTHER PUBLICATIONS

Van Deren et al., Journal of the American Leather Chemists Association, Vol. 73, No. 1, (1978), pp. 498–507.

*Primary Examiner*—Paul Lieberman
*Assistant Examiner*—John F. McNally
*Attorney, Agent, or Firm*—Curtis, Morris & Safford

[57] ABSTRACT

Tanning agents containing a complex formed between chromium ions and an acrylate or methacrylate polymer and further including an organically bound thio group present in said polymer or in a mercapto compound added to the tanning agents, and methods for pickling, tanning, and retanning skins and hides with such tanning agents.

14 Claims, No Drawings

ACRYLATE TANNING AGENT

The present invention relates to chrome polyacrylate tanning agents useful in leather manufacture, and to methods for pickling, tanning, and retanning skins or hides with such tanning agents.

The Prior Art

Chrome tanning today accounts for about 80 percent of all leather production. However, the use of chromium compounds does pose certain problems from both the point of view of cost and of the environment. This is why the industry has taken great pains to improve its processes and particularly to improve chrome exhaustion.

Strongly masked chrome tanning agents are predominantly used. (Cf. Ullmann's *Encyclopedia of Industrial Chemistry*, 5th Edition, Vol. A7, pp. 81–83, Verlag Chemie, 1986; *Bibliothek des Leders* [*Leather Library*], H. Herfeld, Vol. 3, Gerbmittel, Gerbung und Nachgerbung [Tanning Agents, Tannage, and Retannage], pp. 67–88, Umschau-Verlag, Frankfurt, 1984.)

The masking agents used are primarily mono-and dicarboxylic acids. In such chrome saving processes, the available chromium oxide usually ranges from 0.8 to 1.3 percent by weight as $Cr_2O_3$, as compared with 1.9 to 2.5 percent (by weight of the pelts treated) in conventional processes. Notwithstanding the low chromium oxide availability, the wet blue has a chromium oxide content of 4 to 5 percent, based on the dry weight of the treated pelt. The $Cr_2O_3$ content of the residual liquor (about 20 percent of the total liquor) is from 0.3 to 1.5 grams per liter. The finished leathers produced by the highly exhaustive processes generally exhibit greater fullness and grain firmness and also can be dyed more evenly.

Another approach to lowering the chromium content of the waste water is recycling. (See J. E. Burns et al., J. Soc. Leather Technol. Chem. 60, 106 [1976]; H. W. Arnoldi et al., ibid. 60, 106 [1976].) Suggestions for the direct reuse of the tan liquors as a pickle liquor or with tan liquors are also found here. By using this method, the need for tanning agents can be reduced by approximately 20 percent. Precipitation of the chromium is frequently carried out along with the recycling method. (See H. Herfeld, Das Leder 25, 134 [1981]; J. M. Constantin et al., Das Leder 31, 52 [1980].) The chromium is precipitated with alkali, redissolved, and reused.

In the patent literature, the use of polyacrylic and polymethacrylic acids in pickling and tanning is described. There, improved chromium exhaustion is likewise observed. The suitability of polyacrylic or polymethacrylic acid for use as a tanning agent particularly in chrome tannage is documented in many publications. (See, for example, French patents Nos. 1,415,763 and 1,549,717, German patents Nos. 19 30 225 and 27 55 087, U.S. Pat. No. 3,997,486, European patent No. 118,213; Kozyreva et al., Chem. Abstr. 89, 131,076 q; Larkina et al., Chem. Abstr. 79, 6807 w.) German patent No. 27 55 087 discloses a process for the tannage and/ or retannage of pelts or leathers with substances having tanning action in the presence of Cr(III) salts, to which dicarboxylic acids, emulsifiers and acid-binding agents may further be added. Polymers and/or polycondensates of monomers carrying carboxyl groups are used as substances having tanning action. The polymers preferably have a molecular weight of about 170 to 30,000. From German patent publication 34 06 912, a process for the retanning of mineral-tanned, and particularly chrome-tanned, leather is known in which the leather is treated with an aqueous solution of a chromium-doped organic polymer complex compound containing carboxyl groups. Both publications propose the use of acid polymers or copolymers of acrylic and/or methacrylic acid. Moreover, British patent No. 2,068,999 recommends a process for improving the stability of skins which provides for the treatment of the skins with a salt of a polyvalent metal, for example, a chromium salt, and a polymer or oligomer containing carboxyl groups or hydroxyl groups. The molecular weight of the polymers is preferably in excess of 500.

Synthetic tanning agents which are based on oligomeric to polymeric acids, have a polybutene skeleton, and are obtained by hydrolysis from the neutral compounds (esters and ethers) are known from Czech patent No. 208,566. Chromium salt can be added to the reaction mixture before or after the hydrolysis. Molecular weights ranging from 150 to 2,500 are said to be particularly advantageous so far as penetrating power is concerned. The starting materials are, in particular, acrylate emulsions which find use in retannage, for example.

German patent No. 31 1 496 suggests the use of copolymers of polyacrylamide or polymethacrylamide with cationic groups in retannage.

The Object of the Invention

The technology of chrome tanning continues to be in need of methods for the manufacture of leathers that satisfy as many of the present-day requirements as possible while making optimum use of the chromium employed. Much importance is attached to securing optimal colorability of the leathers produced. With conventional methods, the chromium oxide content of the residual liquor (based on 20 percent liquor) generally ranges from 6 to 8 g/l. The $Cr_2O_3$ content of the wet blue usually is also between 4 and 4.5 weight percent.

It has been found that acrylate tanning agents ideally meet the practical requirements, especially in chrome tannage, when they comprise at least one organically bound component containing at least one thio group. (In keeping with the IUPAC recommendation "Nomenclature of Organic Chemistry", Butterworth 1969, p. 211, thio here denotes an -S-group.) As active ingredients, the acrylate tanning agents in accordance with the present invention comprise polymers which include repeating units of the formula

Wherein $R_1$ is hydrogen, methyl, or a $-CH_2COOR_2$ group wherein $R_{22}$ represents hydrogen or an alkyl group having from 1 to 22 carbon atoms, and Q is a $-COOM$ group, a cyano group, or a $-CONR_3R_4$ group wherein $R_3$ and $R_4$ represent, independently of each other, hydrogen or an alkyl group having from 1 to 6 carbon atoms, or with inclusion of a further nitrogen, oxygen, or sulfur atom form a (preferably saturated) heterocycle, and M represents hydrogen or an alkali-metal, ammonium, alkaline-earth or chromium cation, the component containing at least one organically bound thio group being preferably a constituent of the polymer, with the provision that the meaning of Q may be the same or different for all repeating units of formula (I), and that the proportion of repeating units of formula (I) in the polymer be always at least large enough to assure its water solubility (at 20° C.).

The requirement in accordance with the invention that the acrylate tanning agent comprise a component containing at least one organically bound thio group can be met by preparing the polymer by polymerization in the presence of at least 5, preferably at least 10, and especially at least 15 and up to 60 percent, by total weight of the monomers, of one or more mercapto compounds of the formula $R_7SH$.(formula IV)

The polymers

The repeating units of formula (I) preferably amount to $(100-x)$ percent by weight of the polymers, where x denotes the percentage of their composition represented by the component containing at least one organically bound thio group.

More particularly, the repeating units of formula (I) represent from 60 to 95, and especially from 70 to 90, percent by weight of the polymers.

The polymers generally have an average molecular weight ranging from 200 to 30,000, and more particularly from 200 to 15,000, and especially from 200 to 1500, as determined by gel permeation chromatography.

The acrylate tanning agents to be used in accordance with the invention preferably are chromium-doped polymeric complex compounds. More particularly, the polymeric complex compounds doped with chromium are derived from the polymers of the invention.

As a rule, a doping ratio of chromium to Q unit (see formula [I]) in the polymer of from 1:0.2 to 1:150 will be appropriate. When the chromium-doped polymeric complex compounds are used in pickling and in main tannage, the numerical ratio of chromium to Q unit advantageously ranges from 1:0.3 to 1:100, and preferably from 1:0.4 to 1:3. When they are used in retannage, which is a particularly preferred use, the ratio of chromium to Q unit generally also ranges from 1:0.3 to 1:100, and advantageously from 1:0.3 to 1:50, and more particularly from 1:0.2 to 1:2.5.

Particularly preferred are polymers which overall have a polyanionic character.

Accordingly, the polymers to be used in accordance with the invention are preferably prepared from monomers of the formula

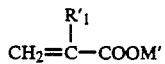
(IA)

wherein $R'_1$ is hydrogen or methyl and M' is hydrogen or a cation of an alkali metal such as sodium or potassium, or an ammonium or chromium cation (in proportions corresponding to their valences), in an amount of from 0 to $(100-x)$, x being preferably from 5 to 60, and more particularly from 10 to 40, and specifically from 20 to 40, weight percent. Moreover, the polymers may be composed of monomers of the formula

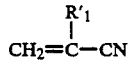
(IB)

wherein $R'_1$ has the meaning given above, in an amount from 0 to 50, and preferably from 0.5 to 30, and specifically from 5 to 20, weight percent, and/or of monomers of the formula

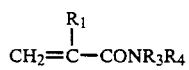
(IC)

wherein $R'_1$, $R_3$ and $R_4$ have the meanings given above, in an amount from 0 to 50, and preferably from 5 to 20, weight percent, and/or of monomers of the formula

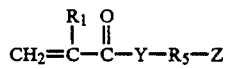
(II)

wherein $R_1$ has the meaning given above and

Y is oxygen or a $-NR_4$ group, $R_5$ is an optionally branched alkylene group having from 1 to 8, and preferably from 2 to 6, carbon atoms, and Z is a OH group or a $NR'_3R'_4$ group wherein $R'_3$ and $R'_4$ have the same meanings as $R_3$ and $R_4$, or a $-CN$ group, a $-SO_3M'$ M' group, or a

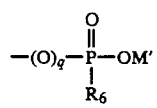

group wherein $R_6$ is hydrogen or a $-OM'$ group, q is 0 or 1, and M' has the meaning given above.

The content of monomers of formula (II) of the polymers used in accordance with the invention usually ranges from 0 to 60, and preferably from 2 to 40, and specifically from 10 to 30, weight percent. The composition of the polymers to be used in accordance with the invention may further include minor amounts ranging from 0 to 20, and more particularly from 0.5 to 15, and specifically from 1 to 12, weight percent of nonhydrophilic monomers of the general formula

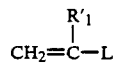
(III)

wherein $R'_1$ has the meaning given above and L is a $-COOR_6$ group, or

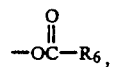

or a $-OR_6$ group, wherein $R_6$ is an alkyl group or a hydroxyalkyl group having from 1 to 20, and preferably from 1 to 12, and more particularly from 1 to 4, carbon atoms, or a cycloalkyl group having from 5 to 6 carbon atoms, or wherein L is a phenyl group, optionally substituted with one or two alkyl groups having from 1 to 2 carbon atoms.

The monomers of formula (II) generally range from sparingly water-soluble to water-insoluble. Examples are ethyl acrylate, butyl acrylate and hydroxyethyl acrylate.

Representative of formula (IA) are acrylic and methacrylic acid and the salts derived therefrom, such as the alkalimetal and ammonium salts, and in particular the sodium or potassium salts. An example is a polymer composed of 90 weight percent of acrylic acid and 10 weight percent of ethyl acrylate.

Representative of the monomers of formula (IB) are acrylonitrile and methacrylonitrile.

Representative of formula (IC) are, above all, acrylamide and methacrylamide and the N-alkyl-substituted amides (i. e., derivatives of the primary amines, $H_2NR_2$), but also monomers wherein $R_5$ is a $(CH_2)_2$, $-(CH_2)_3-$, $-CH_2-CH(CH_3)$ $-CH_2$ —or $-CH_2C(CH_3)_2-CH_2-$group.

Of interest are, for example, monomers wherein R has the meaning given above and Z represents $-SO_3H$, such as betasulfoethyl-acrylate and-methacrylate, betasulfoethylacrylamide and -methacrylamide, N-acryloyl-2-amino-2-methylpropanesulfonic acid, 2-acrylamidododecanesulfonic acid, and the homologous methacrylamino compounds.

Of interest are further compounds wherein Z represents —CN, for example, 2-cyanoethyl-acrylate and-methacrylate, 2-cyano1-methylethyl-acrylate and-methacrylate, and N-2-cy and -methacrylamide.

Representative of monomers wherein Z represents -OH are 2-hydroxyethyl-acrylate and-methacrylate, 2-hydroxypropyl-acrylate and-methacrylate, 2-hydroxyethylacrylamide and -methacrylamide, 2-hydroxy-2-methylpropyl-acrylate and-methacrylate, and 4-hydroxybutyl-acrylate and-methacrylate.

The monomeric constituents (IA), (IB), (IC), (II), (III) and Jul. 21, 1988 component (IV) of the polymers together make up 100 weight percent. In view of their use as substances having tanning action or as tanning aids, the resulting polymers are (a) water-soluble per se or (b) can be converted into water-soluble derivatives by controllable hydrolysis.

As a rule, the polymers will be present in an aqueous solution before chrome tannage in amounts from 1 to 80, and preferably from 5 to 60, and most preferably from 10 to 40, weight percent. The acid value of the polymers preferably ranges from 100 to 800, and more particularly from 600 to 800.

Particularly advantageous is the preparation of the polymers from 60 to 95 mole percent of monomers of formula (IA), 10 to 40 mole percent of monomers of formula (IB) or monomers of formulas (IC) and (II), 0 to 20 mole percent of monomers of formula (III), and 5 to 60, preferably 5 to 40, weight percent (based on the monomers) of mercapto compounds of formula $R_7SH$ which are incorporated into the polymer in the course of polymerization.

The aqueous polymer solutions can be prepared by dissolving the polymers in water or, as intimated above, by hydrolysis of polymers which per se are not soluble or not completely soluble and serve as intermediates. These are usually polymers whose composition includes less than 25 mole percent of hydrophobic monomers.

Polymers which are insoluble or incompletely soluble are preferably hydrolyzed with alkalies, and particularly NaOH, KOH or aqueous ammonia, generally as a 25-to 70-percent liquor, at temperatures between 20° and 220° C. At temperatures above the boiling point, the polymer is heated in a pressure vessel, generally at from 15 to 20 atmospheres gage pressure. The reaction times usually range from 5 to 24 hours, depending on the nature and concentration of the alkali used and on the temperature. The pH is then adjusted to a value between 2.5 and 7.5, and more particularly between 3 and 7, with an acid, preferably one that is compatible with the tanning process, and more particularly an organic acid such as formic acid, acetic acid, or a dicarboxylic acid such as oxalic acid, malonic acid or glutaric acid, and especially adipic acid and/or succinic acid. In place of low-molecular-weight acids, polymeric acids, for example, polymers of acrylic or methacrylic acid, may be used. The hydrolysis and the acidification may be carried out substantially as described in German patent No. 32 48 485.

Preparation of polymers

The polymers of the desired structure may be prepared, as mentioned earlier, either by free-radical polymerization of the monomers (IA), (IB) and (IC), and optionally (II), (III) and (IV), or by hydrolytic decomposition (see above) of intermediate polymers. The component containing at least one organically bound thio group is incorporated in the polymer, as required by the invention, by conventional free-radical polymerization of the total monomers in the presence of at least 5, and preferably of 10, and specifically of 20 and up to 60, weight percent (based on the monomers) of mercapto compounds of formula (IV).

The free-radical polymerization of said monomers is known per se. (See, for example, H. Rauch-Puntigam and Th. Völker in "Acryl- und Methacrylverbindungen"[Acrylic and Methacrylic Compounds], Springer-Verlag, 1967, and Houben-Weyl, 4th ed., vol. XIV/1, Makromolekulare Stoffe [Macromolecular Substances], part 1, pp. 1010–1078, Georg Thieme Verlag, 1961.) So far as the hydrophilic monomers of formulas (IA), (IB) and (IC) or of formula (II) are concerned, the polymerization may be carried out in aqueous solution and with the addition of preferably water-soluble initiators, such as $(NH_4)_2S_2O_8$, $H_2O_2Fe_2(SO_4)_3 \times 5H_2O$ and the like. The initiator concentration usually ranges from 0.01 to 20 weight percent, based on the monomers. The concentration of the monomers is frequently under 30 weight percent and may range from 10 to 25 weight percent, for example, based on the total mixture. However, it may also be higher. With water-soluble monomers of the formulas (IA) to (IC) and (II), and-particularly with acrylamide and methacrylamide and acrylic and methacrylic acid, good results are also obtained with the so-called reverse-suspension polymerization method, in which a concentrated aqueous solution of the monomers, for example, a 10 to 60 weight percent solution, is emulsified in an oil phase, preferably a hydrocarbon, and polymerized with a water-soluble initiator.

Suitable dispersing agents are, in particular, Pickering emulsifiers such as alkaline-earth carbonates, sulfonates and silicates as well as aluminum hydroxide, polymers with hydrophilic groups, for example, carbohydrates such as starch and cellulose derivatives, protein compounds such as gelatin, water-soluble synthetic high polymers such as polyvinyl acetate, polyacrylic and polymethacrylic acid and amides, and/or block or graft copolymers with different solubilities of the polymeric units. (See German patent publication No. 10 81 228, U.S. Pat. No. 3,767,629, and German patent No. 20 09 218.) Generally they are used only in amounts from 0.5 to about 5 weight percent, based on the water phase. The reactors used are discontinuously stirred tanks, optionally agitated from the bottom by impellers.

When other polymerization processes such as solution polymerization are employed, other accelerators such as azo initiators (azoisobutyronitrile) or peroxides (di-tert-butyl peroxide, dibenzoyl peroxide) may also be used, in amounts from 0.01 to 10 weight percent. (See also Rauch-Puntigam, loc. cit.)

Suitable for use as a chain-transfer agent for the component containing at least one organically bound thio. group, and as a component in itself, is preferably a mercapto compound of the formula $$R_7SH \qquad (IV)$$

wherein $R_7$ is an optionally branched, optionally cyclic, alkyl group having from 2 to 24, and more particularly from 2 to 18, and specifically from 2 to 12, carbon atoms, the alkyl group being optionally hydroxy-substituted (compound of formula (IVA), or is a $-(CH_2)_n-NR''_3R''_4$ group wherein $R''_3$ and $R''_4$ have the same meanings as $R_3$ and $R_4$ and n signifies 2 to 6 (compound of formula (IVB), or is a $-R_8-COOR_9$ group wherein $R_8$ is an optionally branched alkyl group having from 2 to 6 carbon atoms, optionally substituted with a further $COOR_9$ group, $-SH$ being optionally bound to a primary, secondary or tertiary carbon atom, and $R_9$ being hydrogen or an alkyl group having from 1 to 6 carbon atoms (compound of formula (IVC).

Representative of the compounds of formula (IVA) are, for example, the n-alkylthiols, such as n-butylmercaptan, n-amylmercaptan and n-dodecylmercaptan, mercaptans from Lorol ® types, n-tetradecylmercaptan, n-octadecylmercaptan, and also tertiary aliphatic mercaptans such as tert-butylmercaptan, tert-menthanethiols (U.S. Pat. No. 2,535,557), tert-dodecylmercaptan, terttetradecylmercaptan, and tert-hexadecylmercaptan (G. R. Mitchell et al., Rubber Age 62, 56 [1947], New York), and especially hydroxy-substituted alkylmercaptans such as 2-mercaptoethanol as well as water-soluble mercaptans (U.S. Pat. No. 2,974,123). Representative of formula (IVB) is beta-(di-n-amylamino)ethylmercaptan (U.S. Pat. No. 2,620,328), for example. Representative of formula (IVC) are the mercaptomono- and dicarboxylic acids, such as mercaptoacetic acid, 2-mercaptopropionic acid, 3-mercaptopropionic acid and mercaptosuccinic acid as well as their esters with aliphatic $C_1$ to $C_6$ alcohols.

A plurality of compounds with SH groups of the formula (IV) may be used concurrently.

With the inventive acrylate tanning agents according to the invention, the sulfur content of the acrylate tanning agents (IV) is at least 7, and preferably 14, weight percent, based on the polymer in an aqueous liquor (i. e., in the majority of cases, based on the polymers in the form of chromium-doped polymeric complex compounds in an aqueous medium, optionally with the addition of further tanning aids such as aluminum compounds. In a particularly practical embodiment of the invention, the components having at least one organically bound SH group are used as compounds of formula (IV), completely or partially, even in the polymerization resulting in the polymers. The compounds of formula (IVA) in particular have, as pointed out, more or less pronounced chain-transfer properties and in the polymerization serve to control the molecular weight. (See Houben-Weyl, loc. cit., vol. XIV/1, pp. 320–324.) They can therefore be used conventionally in the polymerization (see "Preparation of polymers") in addition to such commonly used initiators as peroxy compounds, peroxides, and azo compounds.

Preparation of acrylate tanning agents

The chrome tanning agents used are primarily conventional chrome tanning agents (see "The prior art"), that is, salts of trivalent chromium, which are known to agglomerate to isopolybases. They are predominantly powdered chrome tanning agents or highly concentrated chrome liquors based on chromium(III)sulfates, usually obtained by reduction of sodium dichromate with sulfur dioxide or other organic reducing agents, which as commercial products usually are already basified. (See Ullmanns Enzyklopädie der technischen Chemie, 4th ed., vol. 9, p. 615, and vol. 16, p. 146; F. Stather, Gerbereichemie und Gerbereitechnologie [Tanning Chemistry and Tanning Technology], Akademie-Verlag, Berlin 1967, pp. 402–439.)

The basicity of the chrome salts or chrome liquors, that is, the unit of measure for the amount of chromium bound to OH groups in a salt or a solution, usually is 33 percent and can be as high as 58 percent.

Examples are the powdered chrome tanning materials used in the "chrome undissolved" method.

Illustrative of commercial chrome products that are ready for tanning are Baychrom ® (Bayer AG), Chrometan ® (British Chrome & Chemicals), Chromitan ® (BASF), Chromosal ® (Bayer AG) and Salchromo ® (Stoppani, Italy). A widely used commercial tanning agent contains 26 percent chromium oxide and has a basicity of 33 percent. The amounts used will depend on the desired doping ratio of chromium to Q unit.

The polymers are used either as relatively concentrated. aqueous solutions in the range from 10 to 60 weight percent, for example, a guide value being about 40 weight percent, or in solid form and dissolved in or diluted with water.

As a guide for the concentration of the polymers after dilution, about 1 part by weight of the polymer-should be dissolved in from 1.5 to 25 parts by weight of water. The chrome tanning agent is preferably added gradually and with thorough mixing, for example, by constant stirring. The tanning agent then dissolves with complex formation. Stirring is then advantageously continued for some time, for example, for from two to three hours, the solution is heated to about 70° to 80° C. over a short period of from 15 to 30 minutes, for example, and then allowed to cool.

Particularly advantageous is the use of polyacrylic or polymethacrylic acid or of copolymers with about 10 weight percent of ethyl acrylate ranging in molecular weight from 300 to 2,000, which as a result of the manufacturing process contain from about 10 to 60 weight percent of a compound of the formula $R_7SH$, for example n-dodecyl mercaptan.

Use of tanning agents

The thio -containing chrome polyacrylate tanning agents of the invention are preferably used with a low ratio of liquor to hide stock (from 20 to 40 percent). They are used shortly after the forerun or main chrome tanning agent has been added. (Bibliothek des Leders [Leather Library], H. Herfeld, ed., vol. 3, pp. 175 ff., Umschau-Verlag, Frankfurt.)

Pretannage

The chrome polyacrylate tanning agents may be used directly in the pickle liquor after the salt and acid addition, or -after pickling, for pretannage.

Common salt and the usual acids, preferably formic acid/ sulfuric acid, are added to the pickle liquor, preferably in that order. (See F. Stather, loc. cit., pp. 423–424.) The pickling time ranges from 1 to 2 hours on the average.

The leathers so pretanned can be split and shaved and, depending on the type of the leather, tanned with chrome, syntan or vegetable tanning materials, or combinations thereof.

Tannage

When mono- or dicarboxylic acids having a masking effect are further incorporated in the preparation of the chrome polyacrylate tanning agents, very highly masked tanning agents are obtained.

Whenever a highly masked chrome polyacrylate tanning agent is used, the basicity should be increased to pH 4.0 to 4.3 during the tannage. This may be done by the concurrent use of highly basic, self-basifying chrome tanning materials, for example, or by the addition of magnesium oxide or $CaMg(CO_3)_2$ (dolomite). As usual, tanning is preceded by a pickling operation, for example, one of the usual type. (See, for example, F. Stather, loc. cit., pp. 423–424.) The chrome polyacrylate tanning agent is advantageously used in main tannage preferably before or together with a basifying agent after a pretreatment with a commercial 33% basic chrome tanning material.

The duration of the tannage is determined, within certain limits, by the type and source of the hides, as usual. For example, with cattle pelts (split thickness, about 2.0 to 3.5 mm), it will range from about 6 hours to overnight. The stock is advantageously kept in motion. The temperature is preferably higher than room temperature, for example, 39 to 40° C.

Retannage:

The chrome polyacrylate complexes of the present invention are also useful in retannage. This step is preferably performed in a liquor designed for neutralizing which at the time of adding the above mentioned tanning agents has a pH of from 3 to 3.5.

Those tanning agents may be applied per se or in combination with other chrome tanning agents, aromatic syntans or tanning agents. The liquors usually amount to 150–300% of the pelts and will have a temperature of 40°–50° C. About 2 hours after addition of the chrome polyacrylate tanning agents, the pH of the liquor is adjusted to 4.5–5.5 depending on the type of leather wanted, by adding sodium formate and bicarbonate.

Leather obtained after such retannage with chrome polyacrylates have a very soft feel and display a uniform deep color.

Advantages

Particularly advantageous is the use of chrome polyacrylate tanning agents, as derivatives of the inventive polymers, which have a sulfur content from 7 to 20 weight percent, based on the polymer. Advantageously the polymers have a molecular weight ranging from 200 to 1,500.

These polymers can be used to prepare liquid formulations which, in contrast to the sulfur-free polymers in the same molecular weight range, will not solidify to a jellylike mass for at least eight weeks when stored at room temperature (about 25° C.).

Surprisingly, it was found that the use of chrome acrylate tanning agents with a fairly high sulfur content is attended by an odor reduction or even suppression. In contrast to sulfur-free chrome polyacrylate tanning materials, the sulfurcontaining chrome polyacrylate tanning agents give wet blues of a very uniform light-blue color that lends itself particularly well to pastel-colored dyeing. Dyeing is found to be very even. With the sulfur-containing chrome polyacrylates, it is possible to increase the basicity to a higher final pH value than with the corresponding sulfur-free compounds without the chrome tanning agent being precipitated. More basic pH values in turn result in a higher degree of exhaustion of the chrome tanning agents. Moreover, when sulfur-containing chrome acrylate tanning agents are used in tanning, a softer feel of the leathers is obtained.

A better understanding of the invention and of its many advantages will be had from the following Examples, given by way of illustration. In the Examples, intrinsic viscosity (ml/g) is determined in conformity with IZOD 1628-6 and reduced viscosity in conformity with DIN 1342.

EXAMPLES

EXAMPLE 1

100 kg of delimed and bated cattle pelts, split thickness 2.0 mm, are processed as follows:

Upholstery leather

Pickling:
20.0% water, temperature 23° C.
5.0% common salt; gentle agitation for 10 to 15 minutes
0.7% formic acid; gentle agitation for 10 minutes
0.5% sulfuric acid; gentle agitation for 90 minutes Cut tested with bromocresol green: 90% yellow pH of liquor: 2.8 to 3.0

Chrome tannage:
3.2% chrome tanning agent with 26% $Cr_2O_3$, 33% basic
  (e. g., Chromosal B ®, Bayer AG)
  Gentle agitation for 60 minutes
  pH of liquor: 3 to 3.3
2.8% chrome polyacrylate tanning agent, 5° to 6° Bé

($Cr_2O_3$ content, 7.2%; molecular weight of polyacrylate, 1,200 to 1,300; Cr:COOH ratio 1:1.6, as in Product 1; sulfur content, 7.7 wt. %)
0.5% magnesium oxide
  Gentle agitation overnight or for 6 hours
  Temperature 38 to 40° C.
  Final pH of liquor: 4.0 to 4.2
1. Total available chromium oxide: 1.0%
2. $Cr_2O_3$ content of leather: 4.6%
3. $Cr_2O_3$ content of residual liquor (25%): 0.78 g/l
4. Shrinkage temperature: 98° C. The chromium distribution in the wet blue is uniform.

The wet blues are retanned conventionally, e. g., with aromatic syntans and/or vegetable tanning materials, then dyed and fatliquored.

The leathers obtained are fuller and firmer-grained than leathers produced by a conventional chrome-tanning process (1.9% available $Cr_2O_3$) The leathers in the crust condition exhibit good grain luster an regularity of color. They have better grain firmness than the leathers from Application Example 3 but are somewhat less soft.

Comparative values (conventional tanning process):
Chromium oxide
Leather, 4.4%
Residual liquor (20%): 6.1 g/l
Available chromium oxide: 2%

EXAMPLE 2

100 kg of delimed and bated cattle pelts, split thickness 3.5 mm, are processed as follows:

Shoe upper leather

Pickling:
25.0% water, temperature 33° C.
5.0% common salt; gentle agitation for 15 minutes
0.7% formic acid; gentle agitation for 10 minutes
0.5% sulfuric acid; gentle agitation for 60 minutes Cut tested with bromocresol green: 90% yellow pH of liquor: 2.8 to 3.0
Chrome tannage:
1.15% chrome tanning agent with 26% $Cr_2O_3$, 33% basic
(e. g., Chromosal B ®, Bayer AG)
Gentle agitation for 60 minutes
pH of liquor: 3 to 3.3
3.5% chrome polyacrylate tanning agent (7.2% $Cr_2O_3$; MW of polyacrylate =1200 to 1300, identical with Product 1; Cr:COOH ratio, 1:1.6; sulfur content, 7.7 wt. %)
0.5% magnesium oxide
Gentle agitation overnight or for 6 hours
Temperature 40° C.
Final pH: 4.0
Chromium oxide:
Leather 4.5%
Residual liquor (25%): 0.67 g/l
Available chromium oxide: 1.3%
Shrinkage temperature: 100° C.
The chromium distribution in the wet blue is uniform.

The wet blues are retanned conventionally, e. g., with aromatic syntans and/or vegetable tanning materials, then dyed and fatliquored. The finished leathers exhibit uniform coloring. They are full- and firm-grained. They have better grain firmness than the leathers from Application Example 4, some fullness, and regularity of color.

EXAMPLE 3

100 kg of delimed and bated cattle pelts, split thickness 1.8 to 2 mm, are processed as follows:

Upholstery leather

Pickling:
25.0% water, temperature 23° C.
5.0% common salt
  Gentle agitation; 5.6° Bé
+0.7% formic acid, 85% (1:5)
  Gentle agitation for 10 minutes
+0.5% sulfuric acid, conc. (1:10)
  Gentle agitation for 60 minutes, pH 2.8 to 3
Chrome tannage:
3.2% of a 33% basic chrome tanning agent (e. g., Chromosal B ®, Bayer AG)
  Gentle agitation for 60 minutes, pH 3.0 to 3.3
+2.8% chrome polyacrylate tanning agent (7.2% $Cr_2O_3$; molecular weight, 1,200 to 1,300 as in Product 2; Cr:COOH ratio, 1:0.4; sulfur content of polyacrylate, 7.7 wt. %)
+0.5% magnesium oxide
  Gentle agitation overnight or for 6 hours
Temperature 40° C.
Final pH in tannage: 4.0 to 4.2
Available chromium oxide:
1.0%
Chromium oxide:
Leather: 4.0%
Residual liquor: 0.87 g/l
Shrinkage temperature: Less than 100° C.
The chromium distribution in the wet blue is uniform.

The wet blues are retanned conventionally, e. g., with aromatic syntans and/or vegetable tanning materials, then dyed and fatliquored. The finished leathers are very soft and uniformly colored. They also exhibit a fine grain luster. However they are not as full and firm-grained as the leathers from Application Example 1.

EXAMPLE 4

100 kg of delimed and bated cattle pelts, split thickness 3.5 mm, are processed as follows:

Shoe upper leather:

Pickling:
25.0% water, temperature 23° C.
5.0% common salt; gentle agitation for 10 to 15 minutes
0.7% formic acid; gentle agitation for 10 minutes
0.5% sulfuric acid; gentle agitation for 60 minutes
  Cut tested with bromocresol green: 90% yellow
  pH of liquor: 2.8 to 3.2
3.7% chrome polyacrylate tanning agent (7.2% $Cr_2O_3$; molecular weight of polyacrylate, 1,200 to 1,300, as in Product 2; Cr:COOH ratio, 1:0.4)
Gentle agitation for 60 minutes
Sulfur content of polyacrylate, 7.7 wt. %
Chrome tannage:
1.15% chrome tanning agent (33% basic, 26% $Cr_2O_3$, e. g., Chromosal B ®, Bayer AG)
  Gentle agitation for 60 minutes
  pH of liquor, 3.2
3.8% chrome tanning agent (67% basic, 21% $Cr_2O_3$, e. g., Baychrom A ®, Bayer AG)
0.35% magnesium oxide
  Gentle agitation overnight or for 6 hours
  Temperature 40° C.
  Final pH: 4.0 to 4.2
Chromium oxide:
Leather: 3.9%
Residual liquor (25%): 1.5 g/l
Available chromium oxide: 1.3%
Shrinkage temperature: 98° C.
The chromium distribution in the wet blue is not as uniform as in Application Example 2.

The wet blues are retanned conventionally, e. g., with aromatic syntans and/or vegetable tanning materials, then dyed and fatliquored. The leathers obtained are soft and colored deeper but do not have a full feel and as firm a grain as those from Application Example 2.

EXAMPLE 5

Procedure as in Application Example 2. Use of 3.7% of a chrome polyacrylate tanning agent with 7.2% $Cr_2O_3$; Cr:COOH ratio, 1:3.8, molecular weight of polyacrylate, 1,200 to 1,300; sulfur content of polyacrylate, 7.7 wt. %; identical with Product 3.
Analytical data:
$Cr_2O_3$ content of leather: 4.1%
residual liquor (25%): 0.78 g/l
Shrinkage temperature: 97° C.

Available chromium oxide: 1.3%

The leathers are firm-grained and uniformly colored. However, they are not as soft and as full as the leathers from Application Example 2 and show a color change (from brown to green-brown, for example). (Nonuniform distribution of chromium in a cross section of the wet blue; overloading of grain and flesh side with chromium due to excessive astringency and hence poorer diffusion.) At the same time, a tendency of the grain to pucker was observed.

EXAMPLE 6

Procedure as in Application Example 4. Use of 3.7% of a chrome polyacrylate tanning agent with 7.2% $Cr_2O_3$; Cr:COOH ratio, 1:3.8; molecular weight of polyacrylate, 1,200 to 1,300; identical with Product 3.
Analytical data:
$Cr_2O_3$ content of leather: 3.7%
residual liquor (25%): 1.8 g/l
Shrinkage temperature: 94° C.
Available chromium oxide: 1.3%

The leathers obtained are softer and fuller than those from Application Example 5, and the change in coloration is less pronounced. Still, they do not match the overall properties (softness, fullness and coloration) of the leathers from Application Example 2.

EXAMPLE 7

Procedure as in Application Example 4. Use of 3.7% of a chrome polyacrylate tanning agent with 3.4% $Cr_2O_3$; Cr:COOH ratio, 1:22; molecular weight of acrylate polymer (90% acrylic. acid, 10% ethyl acrylate), 2,100; identical with Product 4. Sulfur content of copolymer: 3.3 wt. %.
Analytical data:
Available chromium oxide: 1.2%
$Cr_2O_3$ content of leather: 4.1%
residual liquor (25%): 0.3 g/l
Shrinkage temperature: 94° C.

The chromium distribution in the wet blue is nonuniform. (More chromium on grain and flesh side.) The leathers obtained are uniformly colored and firm-grained. However, they are not as soft as the leathers from Application Example 4. No color change is observable.

Preparation of chrome polyacrylate tanning agents

Product 1: Low-molecular-weight chrome polyacrylate 328 g of low-molecular-weight polyacrylic acid, Product Pla (sulfur content, 7.7 wt. %) (40% solution; molecular weight, 1,250), and 396 g of water are gradually added with constant stirring to 276 g of a chrome tanning agent (26% chromium oxide, 33% basicity). After all of the chrome tanning agent has been dissolved with complex formation, stirring is continued for another 2 to 3 hours. The mixture. is then heated over a short period to 70°-80° C. and then allowed to cool.
Analytical data:
pH (10%): 1.93
pH (conc.): 1.00
$Cr_2O_3$ content: 7.2%
Cr:COOH ratio: 1:1.6

Product 2

80 g of a low-molecular-weight polyacrylic acid, Product Pla 40% solution; molecular weight, 1,250), and 644 g of water are mixed with 276 g of a chrome tanning agent (26% chromium oxide, 33% basicity) and further processed as described under Product 1.
Analytical data:
pH (conc.): 1.59
pH (10%): 2.50
$Cr_2O_3$ content: 7.2%
Cr:COOH ratio: 1:0.4

Product 3

1 kg of low-molecular-weight polyacrylic acid, Product Pla (40% solution; molecular weight, 1,250), is mixed with 380 g of a chrome tanning agent (26% chromium oxide, 33% basicity) and processed further as described under Product 1.
Analytical data:
pH (conc.): 0.95
pH (10%): 1.95
$Cr_2O_3$ content: 7.2%
Cr:COOH ratio: 1:3.82

Product 4

1 kg of a copolymer (90% acrylic acid, 10% ethyl acrylate; 40 wt. %; molecular weight, 2,100; polymerization procedure as with Product Pla) is mixed with 150 g of a chrome tanning agent (26% chromium oxide, 33% basicity), and the mixture is stirred for 2 hours and then heated during 15 minutes to 70° C.
Analytical data:
pH (conc.): 0.82
pH (10%): 1.84
$Cr_2O_3$ content: 3.4%
Cr:COOH ratio: 1:22

Product 5

Same as Product 1, except that a sulfur-free polyacrylic acid (see preparatory procedure) is used.

Product 6

Same as Product 1, except that a polyacrylic acid (Product Plc) is used which has a molecular weight of 500 and a sulfur content of 14 wt. %, based on the dry solids content.

Product 7

Same as Product 1, except that a copolymer of 80% acrylic acid and 20% hydroxyethyl acrylate is used. (Preparation of copolymer by the polymerization method used for Product Pla.)

Product Pla

Preparation of a low-molecular-weight polyacrylic acid with a molecular weight of 1,200 by a two-stage redox batch process.

The entire first stage (7.49 kg of water, 2.33 kg of acrylic acid, 466 g of mercaptoethanol and 23 g of a 1% $FeSO_4$ solution) is introduced into a reaction vessel as initial charge and initiated at room temperature by the addition of 585 g of perhydrol (30% $H_2O_2$), with the temperature rising to 80° C. After the maximum temperature has been exceeded, the batch is cooled to 35° C. and the complete second stage (2.33 kg of acrylic acid and 466 g of mercaptoethanol) is used and also initiated by the addition of 585 g of perhydrol, with the temperature then rising to 85° C. After the maximum temperature has been reached, the batch is stirred for 1 hour and then cooled.

The polymer has a pH of 1.5, a solids content of 40%, a viscosity of less than 110 mPa•s, and a reduced viscosity of less than 5 ml/g.

Instead of mercaptoethanol, other compounds of formula (IV), e.g. thioglycolic acid, dodecylmercaptan, tert.-dodecylmercaptan, n-butylmercaptan, n-hexylmercaptan, n-octylmercaptan, n-tetradecylmercaptan, or n-hexadecylmercaptan, may be used with similar results. (Cf. U.S. Pat. No. 2,434,054).

Product Plb

Preparatory procedure for low-molecular-weight acrylic acid without a chain-transfer agent 550 g of desalinated water is charged to a 2-liter Witt jar equipped with horseshoe agitator, thermometer and condenser and heated with stirring (at about 100 rpm) to 81° C. When that temperature is reached, the monomer addition is commenced. It consists of 400 g of acrylic acid and 80 g ammonium persulfate which has first been dissolved in 100 g of desalinated water. Over a period of two hours it is continuously added from a feeding funnel. Shortly after the start of the addition, a pronounced temperature rise to 97° C. is observed. After one hour's addition, 80 g of ammonium persulfate, dissolved in 100 g of desalinated water, is added to the reaction mixture. No increase in temperature is observed. On completion of the addition, the mixture is stirred for two hours at 80° C. and then cooled, filtered and filled into containers.

The polymer is somewhat cloudy and colorless. The solids content is 43.0%. An actual viscosity of 31 mPa•s and an intrinsic viscosity of 4.8 ml/g in methanol were determined. The pH value is 1.

Product Plc

Preparation of an extremely low-polymeric acrylic acid as a solution polymer (molecular weight, about 500 to 600) in a three-stage redox batch process To a 2-liter Witt jar equipped with a horseshoe agitator, a thermometer and a condenser there are charged 600 g of desalinated water, 133.3 g acrylic acid, 46.6 g of mercaptoethanol and 58.3 g perhydrol (a 30% hydrogen peroxide solution), and the reaction is initiated with 1 ml of a 1% ferric sulfate solution. The temperature promptly rises to 90° C. and then immediately drops. After approximately half an hour, the batch is cooled to 35° C. 133.3 g of acrylic acid and 46.6 g of mercaptoethanol are then added and the second-stage reaction is initiated with 58.3 g of perhydrol. As in the first stage, the temperature rises markedly. After approximately half an hour, the batch is cooled to about 35° C. The third stage, consisting of 133.3 g of acrylic acid and 46.6 g of mercaptoethanol, is then added and initiated with 58.3 g of perhydrol.

During the entire polymerization time, the batch is stirred at about 110 rpm. After the cooling time, the somewhat cloudy, colorless batch is filtered. The solids content is 41.0%. A dynamic viscosity of 3.3 ml/g in methanol was determined. The pH value is 1.5.

EXAMPLE 8

Procedure as in Application Example 2. Use of 3.5% of a chrome polyacrylate tanning agent with 7.2% $Cr_2O_3$ Cr:COOH ratio, 1:1.35. Molecular weight of acrylate copolymer (80% acrylic acid, 20% hydroxyethyl acrylate), 1,000 to 1,300, identical with Product 7. Sulfur content of copolymer, 7.7%.

Analytical data:
Chromium oxide:
Leather: 4.2%
Residual liquor (25%): 1.15 g/l
Chromium oxide acrylate: 1.3%
Shrinkage temperature: 100° C.
The leathers obtained are somewhat fuller and not quite a soft as those from Application Example 2.

EXAMPLE 9

Procedure as in Application Example 2. Use of 3.5% of a chrome polyacrylate tanning agent with 7.2% $Cr_2O_3$ Cr:COOH ratio, 1:1.65. Molecular weight of sulfur-free acrylate copolymer, 1,000 to 1,300, identical with Product 5.
Analytical data:
Chromium oxide: Leather: 4.3%
Residual liquor (25%): 0.98 g/l
Chromium oxide acrylate: 1.3%
The color of the wet blues obtained is a darker blue than that of those from Application Example 2. The leathers obtained are colored less uniformly than those from Application Example 2.

EXAMPLE 10

Procedure as in Application Example 2. Use of 3.5% of a chrome polyacrylate tanning agent with 7.2% $Cr_2O_3$Cr:COOH ratio, 1:1.6. Molecular weight of acrylate copolymer, 500 to 600. Sulfur content, based on dry weight of polymer, 14%, as in Product 6.
Analytical data:
Chromium oxide:
Leather: 4.55%
Residual liquor: 0.6 g/l
Chromium oxide acrylate: 1.3%
The leathers obtained are distinguished by good fullness, softness, and very uniform color.

Application example 8

Retannage of shoe nappa leather 100 kg of wet blues, split thickness 1,5 mm, weight 100 kg
Washing:
  200% water, temperature 45° C.
  0,2% nonionic tenside (based on nonylphenol plus 8,9 moles of ethylen oxide)
  0,2 % formic acid (85 %)
    Gentle agitation for 60 minutes,
    pH of liquor 3–3.3
  liquor is drained
Retannage:
  100% water, temperature 40° C.
    2% 33% basic chrome tanning agent (26 % $Cr_2O_3$)
    Agitation for 30 minutes
    2% chrome polyacrylate (identical to product 1) is added
    Agitation for 60 minutes
    0,3 % magnesium oxide
    Agitation for 60 minutes
    1,0 % sodium bicarbonate
    Agitation for 60 minutes
    pH=5.4–5.8
    The liquor is drained off
The leather is washed, is greased and dyed in the usual fashion.

The $Cr_2O_3$ content at the end of retannage is found to be 150–220 mg/l. The finished leather is remarkable for its homogeneous and deep color. It has a full grain and very soft feel.

Application example 9

Retannage of wetblues for shoe nappa leather

The precess is conducted as in application example 8, except for use of product 3 instead of product 1. The Cr$_2$O$_3$ conetent in the retanning liquor is 120 mg/Cr$_2$O$_3$l.

The finished leather are very equal, however somewhat less deeply colored than those obtained in application example 8. The leather has a very firm grain; it is not quite as soft as that obtained in application example 8.

What is claimed is:

1. A water soluble tanning agent comprising a complex formed between chromium ion and an acrylate polymer having a molecular weight between 200 and 30,000 and comprising the same or different repeating units of the formula

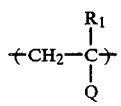

wherein r$_1$ is selected from the group consisting of hydrogen, methyl, or —CH$_2$COOR$_2$ wherein R$_2$ is hydrogen or alkyl having from 1 to 22 carbon atoms, and Q is selected from the group consisting of (a) cyano, (b) —COOM wherein M is hydrogen, ammonium, an alkali metal, an alkaline earth metal, or of chromium, and (c) —CONR$_3$R$_4$ wherein R$_3$ and R$_4$, taken alone, are independently hydrogen or alkyl having from 1 to 6 carbon atoms or, taken together with the nitrogen atom to which they are bound and together with a further nitrogen, oxygen, or sulfur atom, form a heterocycle, said polymer further comprising between 5 and 60 percent by weight of groups of the formula

wherein R$_7$ is alkyl or cycloalkyl having 2 to 18 carbon atoms, or is such alkyl or cycloalkyl substituted by hydroxy, or is —(CH$_2$)$_n$—NR"$_3$R"$_4$ wherein n is an integer from 2 to 6 and R"$_3$ and R"$_4$, taken alone, are independently hydrogen or alkyl having from 1 to 6 carbon atoms or, taken together with the nitrogen atom to which they are bound and together with a further nitrogen, oxygen, or sulfur atom, form a heterocycle, or is —R$_8$COOR$_9$ wherein R$_8$ is alkylene having 2 to 6 carbon atoms and R$_9$ is hydrogen or alkyl having 1 to 6 carbon atoms, or is such an —R$_8$COOR$_9$ group comprising a further —COOR$_9$ substituent.

2. A water soluble tanning agent as in claim 1 wherein the polymer component is prepared by free-radically polymerizing the monomers forming said polymer in the presence of 5 to 60 percent by weight of said monomers, of a mercapto compound of the formula R$_7$SH, wherein R$_7$ is alkyl or cycloalkyl having 2 to 18 carbon atoms, or is such alkyl or cycloalkyl which is substituted by hydroxy, or is —(CH2)$_n$—NR"$_3$R"$_4$ wherein n is an integer from 2 to 6 and R"$_3$ and R"$_4$, taken alone, are independently hydrogen or alkyl having from 1 to 6 carbon atoms or, taken together with the nitrogen atom to which they are bound and together with a further nitrogen, oxygen, or sulfur atom, form a heterocycle, or is —R$_8$COOR$_9$ wherein R$_8$ is alkylene having 2 to 6 carbon atoms and R$_9$ is hydrogen or alkyl having 1 to 6 carbon atoms, or is such an —R$_8$COOR$_9$ group comprising a further —COOR$_9$ substituent, the —SH group of said compound R$_7$SH being bound to a primary, secondary, or tertiary carbon atom of R$_7$, whereby a water soluble product is formed.

3. A water soluble tanning agent as in claim 1 wherein the polymer component is prepared by free-radically polymerizing the monomers forming said polymer in the presence of 5 to 60 percent by weight of said monomers, of a mercapto compound of the formula R$_7$SH, wherein R$_7$ is alkyl or cycloalkyl having 2 to 18 carbon atoms, or is such alkyl or cycloalkyl which is substituted by hydroxy, or is —(CH2)$_n$—"$_3$R"$_4$ wherein n is an integer from 2 to 6 and R"$_3$ and R"$_4$, taken alone, are independently hydrogen or alkyl having from 1 to 6 carbon atoms or, taken together with the nitrogen atom to which they are bound and together with a further nitrogen, oxygen, or sulfur atom, form a heterocycle, or is —R$_8$COOR$_9$ wherein R$_8$ is alkylene having 2 to 6 carbon atoms and R$_9$ is hydrogen or alkyl having 1 to 6 carbon atoms, or is such an —R$_8$COOR$_9$ group comprising a further —COOR$_9$ substituent, the —SH group of said compound R$_7$SH being bound to a primary, secondary, or tertiary carbon atom of R$_7$, whereby a product insoluble or difficultly soluble in water is formed, and then hydrolyzing said product with alkali at temperatures between 20° C. and 220° C. under a pressure of 15 to 20 atmospheres gauge for 5 to 24 hours, and adjusting the pH of the hydrolyzed product to a value between 2.5 and 7.5, whereby a water soluble product is obtained.

4. A tanning agent as in claim 1 wherein, in said complex, the numerical ratio of chromium ions to units Q in said polymer is from 1:0.2 to 1:150.

5. A tanning agent as in claim 1 wherein said same or different repeating units are from 60 to 95 percent by weight of said polymer, the remainder up to 100 percent by weight being organically bound thio groups.

6. A tanning agent as in claim 1 wherein said same or different repeating units are from 70 to 90 percent by weight of said polymer, the remainder up to 100 percent by weight being organically bound thio groups.

7. A tanning agent as in claim 1 wherein said polymer has an acid number from 100 to 800.

8. A tanning agent as in claim 1 comprising from 40 to 95 percent by weight of monomers of the formula

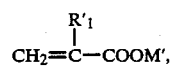

wherein R'$_1$ is hydrogen or methyl and M' is hydrogen, ammonium, or a cation of an alkali metal or of chromium.

9. In a method for making leather which comprises pickling skins or hides in the presence of a chromium tanning agent, the improvement wherein the tanning agent of claim 1 is employed.

10. A method as in claim 9 wherein, in said tanning agent of claim 1, the numerical ratio of chromium ions to units Q in said polymer is from 1:0.1 to 1:100.

11. In a method for making leather which comprises tanning skins or hides in the presence of a chromium tanning agent, the improvement wherein the tanning agent or claim 1 is employed.

12. A method as in claim 11 wherein, in said tanning agent of claim 1, the numerical ratio of chromium ion to units Q in said polymer is from 1:0.1 to 1:100.

13. In a method for making leather which comprises retanning skins or hides in the presence of a chromium tanning agent, the improvement wherein the tanning agent of claim 1 is employed.

14. A method as in claim 12 wherein, in said tanning agent of claim 1, the numerical ratio of chromium ions to units Q in said polymer is from 1:0.3 to 1:50.

* * * * *